United States Patent
Thangamariappan et al.

(10) Patent No.: US 12,485,975 B2
(45) Date of Patent: Dec. 2, 2025

(54) TRUCK CABIN

(71) Applicant: Volvo Truck Corporation, Gothenburg (SE)

(72) Inventors: Balaganesh Thangamariappan, Karnataka (IN); Aditya Hande, Karnataka (IN); Venugopal Kg, Karnataka (IN); Vijay Paranjape, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 390 days.

(21) Appl. No.: 18/188,950

(22) Filed: Mar. 23, 2023

(65) Prior Publication Data

US 2023/0322310 A1    Oct. 12, 2023

(30) Foreign Application Priority Data

Apr. 6, 2022    (EP) .................................... 22167002

(51) Int. Cl.
   *B62D 33/06*    (2006.01)
   *B60N 3/00*    (2006.01)

(52) U.S. Cl.
   CPC ......... *B62D 33/0612* (2013.01); *B60N 3/008* (2013.01)

(58) Field of Classification Search
   CPC ........................... B62D 33/0612; B60N 3/008
   USPC .................................................... 296/190.02
   See application file for complete search history.

(56) References Cited

U.S. PATENT DOCUMENTS

| | | | | |
|---|---|---|---|---|
| 544,982 | A | * 8/1895 | Hoskins | A47C 19/205 297/62 |
| 2,550,599 | A | * 4/1951 | Reed | A47C 19/205 5/9.1 |
| 2,854,672 | A | * 10/1958 | Hagstrom | A47C 19/205 5/8 |
| 3,311,932 | A | * 4/1967 | Ahola | A47C 19/205 296/65.17 |

(Continued)

FOREIGN PATENT DOCUMENTS

| | | | |
|---|---|---|---|
| CN | 103223888 | A * | 7/2013 |
| CN | 203211149 | U * | 9/2013 |

(Continued)

OTHER PUBLICATIONS

European Search Report for European Patent Application No. 22167002.9, completed Sep. 14, 2022, 2 pages.

*Primary Examiner* — Hilary L Gutman
(74) *Attorney, Agent, or Firm* — Withrow & Terranova, PLLC (57) ABSTRACT

A truck cabin comprises a driver's seat, a bunk, and a frame, the frame comprising a rear structure delimiting the rear of the cabin along a longitudinal axis of the cabin. The bunk has the shape of a rectangular cuboid, with two parallel lateral faces, a front face, a rear face parallel to the front face, a lower face, and an upper face parallel to the lower face. The bunk is located between the driver's seat and the rear structure and extends along a transversal axis of the cabin, alongside the rear structure. The bunk is rotatable between a horizontal position, in which the upper face is horizontal and oriented upwardly, and a vertical position, in which the upper face is vertical. In the vertical position, the lower face of the bunk is oriented towards the rear structure and the upper face is oriented towards the driver's seat.

13 Claims, 6 Drawing Sheets

(56) References Cited

U.S. PATENT DOCUMENTS

| | | | | |
|---|---|---|---|---|
| 3,772,716 | A * | 11/1973 | Ratcliff | A47C 17/84 |
| | | | | 5/10.1 |
| 3,811,138 | A * | 5/1974 | Del Missier | A47C 17/17 |
| | | | | 5/118 |
| 3,828,374 | A * | 8/1974 | Del Missier | B63B 29/10 |
| | | | | 5/118 |
| 4,103,373 | A * | 8/1978 | Luedtke | A47C 17/50 |
| | | | | 5/147 |
| 4,279,203 | A * | 7/1981 | Marulic | B61D 31/00 |
| | | | | 5/9.1 |
| 7,069,605 | B2 * | 7/2006 | Harvey, III | A47C 17/52 |
| | | | | 5/2.1 |
| 2007/0294822 | A1 * | 12/2007 | Kenny | A47C 19/20 |
| | | | | 5/9.1 |

FOREIGN PATENT DOCUMENTS

| | | | | |
|---|---|---|---|---|
| CN | 209404174 U | | 9/2019 | |
| DE | 3333879 A1 | * | 3/1985 | |
| DE | 4114554 A1 | | 11/1992 | |
| FR | 1354776 A | * | 3/1964 | B61D 31/00 |
| FR | 1584361 A | | 12/1969 | |
| FR | 2350242 A1 | | 12/1977 | |
| GB | 216201 A | * | 5/1924 | A47C 19/205 |
| GB | 1549901 A | * | 8/1979 | B62D 33/0612 |
| JP | S6112841 U | | 1/1986 | |
| JP | H11318635 A | | 11/1999 | |
| WO | WO-2006055005 A1 | * | 5/2006 | B63B 29/10 |

* cited by examiner

TRUCK CABIN

RELATED APPLICATIONS

The present application claims priority to European Patent Application No. 22167002.9, filed on Apr. 6, 2022, and entitled "TRUCK CABIN," which is incorporated herein by reference in its entirety.

TECHNICAL FIELD

The present invention concerns a truck cabin. The invention can be applied in heavy-duty vehicles, such as trucks, buses and construction equipment. Although the invention will be described with respect to a truck, the invention is not restricted to this particular vehicle, but may also be used in other vehicles.

BACKGROUND

It is known to provide a bunk in truck cabin, to allow drivers to rest. Usually, such a bunk is located between the driver's seat and a rear structure of the cabin, on top of a storage box. To allow access to the storage box, it is known to pivotally attach the bunk to the rear structure, so that the bunk can be pivoted against the rear structure in a vertical position. With known systems, when the bunk is in the vertical position, its lower face is apparent and its upper face, which is a bedding face, is hidden and facing the rear structure. Therefore, in case of an accident and when the bunk is in the vertical position, the driver of the truck can collide with the lower face, which is a hard surface and can thus injure the driver. Moreover, such a bunk is not convenient to use as an upper bunk, in a truck cabin comprising two superposed bunks, because the pivoting of the bunk takes up a lot of space vertically, preventing the bunk from being moved closer to the cabin roof.

JPH11318635A describes a truck cabin comprising two seats and a retractable bunk. The bunk is rotatable between a vertical position, in which its bedding face is facing a rear wall of the cabin, and a horizontal position, in which the bunk rests on the headrest of the seats. For this purpose, the seats can be folded so that their headrests can be arranged horizontally. Such an approach is complex, and therefore expensive, requires a lot of manual handling to change the position of the bunk, and does not allow for two superposed bunks in the cabin.

There is therefore a need for a truck cabin equipped with a bunk that is less expensive to produce, easier to operate and more versatile.

SUMMARY

According to one aspect, the invention relates to a truck cabin comprising a driver's seat, a bunk and a frame, the frame comprising a rear structure delimiting the rear of the cabin along a longitudinal axis of the cabin. The bunk has the shape of a rectangular cuboid, with two parallel lateral faces, a front face, a rear face parallel to the front face, a lower face and an upper face parallel to the lower face and which is a bedding face. The bunk is located between the driver's seat and the rear structure, along the longitudinal axis, and extends along a transversal axis of the cabin, alongside the rear structure. The bunk is rotatable between a horizontal position, in which the upper face is horizontal and oriented upwardly, and a vertical position, in which the upper face is vertical. In the vertical position, the lower face of the bunk is oriented towards the rear structure and the upper face is oriented towards the driver's seat.

An advantage of the invention is that, when the bunk is in the vertical position, the upper face of the bunk improves safety for the driver in case of an accident, by providing a cushioned effect. Furthermore, when the bunk is used in a truck cabin comprising two superposed bunk as the upper bunk, the upper face can also be used as a backrest for when the driver is seated on the lower bunk.

According to advantageous aspects of the invention, the invention may comprise one or more of the following features, considered alone or according to any possible combinations:

- During the rotation of the bunk from the horizontal position to the vertical position, the rear face of the bunk is moving upwardly.
- The frame comprises two horizontal rails located on either side of the bunk along the transversal axis and extending each along an horizontal axis parallel to the longitudinal axis, and at least one vertical rail, extending parallel to a vertical axis perpendicular to the longitudinal axis and to the transversal axis. The bunk is connected to the horizontal rails by two horizontal connector, each horizontal connectors allowing pivoting of the bunk around a first pivoting axis parallel to the transversal axis, the first pivoting axis being shared by the two horizontal connectors, and sliding of the bunk along the horizontal rail. The bunk is connected to the vertical rail by a vertical connector allowing pivoting of the bunk around a second pivoting axis parallel to the transversal axis, and sliding of the bunk along the vertical rail.
- The frame comprises two vertical rails located on either side of the bunk along the transversal axis, the bunk is connected to each vertical rail by a vertical connector, and each vertical connector comprises a bunk pin, connected to the bunk so as to be able to pivot around the second pivoting axis; a rail pin, connected to one of the vertical rails so as to be able to pivot around a third pivoting axis parallel to the transversal axis and to slide along the vertical rail; and a guide link rigidly connecting the bunk pin to the rail pin so that the second pivoting axis and the third pivoting axis are offset from each other.
- An offset distance between the second pivoting axis and the third pivoting axis, measured perpendicular to the transversal axis, is comprised between 100 mm and 300 mm.
- The offset distance between the second pivoting axis and the third pivoting axis, measured perpendicular to the transversal axis, is equal to 200 mm.
- The vertical rail is located on the rear structure and the vertical connector comprises a bracket fixed on the bunk and a slider pivotally attached with the bracket and sliding along the vertical rail.
- The horizontal connectors are located, along the longitudinal axis, on a frontal portion of the bunk and, during the rotation of the bunk from the horizontal position to the vertical position, the front face is stationary along the vertical axis.
- The horizontal connectors are located, along the longitudinal axis, in a middle portion of the bunk and, during the rotation of the bunk from the horizontal position to the vertical position, the front face is moving along the vertical axis downwardly.

The truck cabin comprises a locking mechanism to secure the bunk in the horizontal position and to secure the bunk in the vertical position.

The locking mechanism comprises a striker, fixed on the rear structure, and two latches, fixed on the bunk, a rear latch being located, along the longitudinal axis and when the bunk is in the horizontal position, in a rear portion of the bunk to cooperate with the striker for locking the bunk in the horizontal position and a front latch being located, along the longitudinal axis and when the bunk is in the horizontal position, in a frontal portion of the bunk to cooperate with the striker for locking the bunk in the vertical position.

The locking mechanism comprises a release button, configured to unlock the locking mechanism.

The rotation of the bunk is driven by at least one motor.

The at least one motor is an electric motor.

The rotation of the bunk is driven by a user pushing or pulling on the bunk along the longitudinal axis.

BRIEF DESCRIPTION OF THE DRAWINGS

The invention will be better understood and other advantages thereof will appear more clearly upon reading the following description of an exemplary truck cabin according to the invention, provided solely as an example and made in reference to the appended drawings, in which.

DETAILED DESCRIPTION

Figure 1:
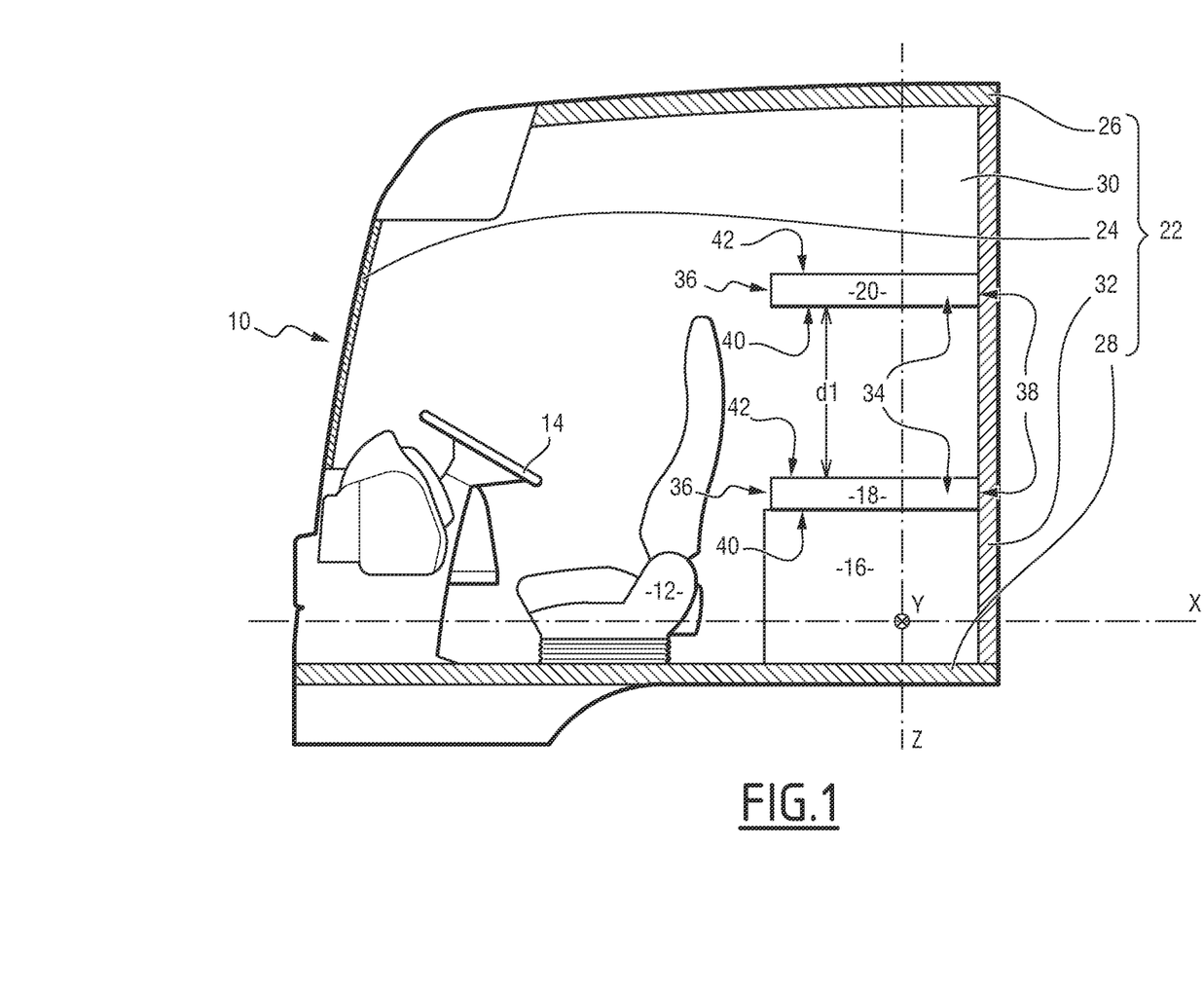
FIG. 1 is a side view of a truck cabin according to one embodiment of the invention.

FIG. 1 shows a first embodiment of an exemplary truck cabin 10 including a driver's seat 12, a steering wheel 14, a storage box 16, a lower bunk 18, an upper bunk 20 and a frame 22.

Here, the frame 22 comprises a windshield 24, a roof 26, a floor 28, two side-wall 30, with only one side-wall visible on FIG. 1, and a rear structure 32, which is, in the embodiment of FIG. 1, a rear wall.

The cabin 10 is intended to be installed on a truck, such as a semi-trailer.

A vertical axis Z is defined as a vertical axis when the cabin 10 is mounted on a truck on flat ground. In the following description, "vertical", "up", "down", "low" and "above" refer to the vertical axis Z.

A longitudinal axis X is defined as corresponding to a main axis of the cabin and of the truck on which the cabin is intended to be installed, i.e. the direction of travel of the truck. In the following description, "front", "back" and "rear" refer to the longitudinal axis X.

A transversal axis Y is defined as a width axis of the cabin 10, and is perpendicular to the longitudinal axis X. In the following description, "left" and "right" refer to the transversal axis Y.

The vertical axis Z is perpendicular to the axes X and Y, which are therefore horizontal. In the following description, "horizontal" refers to any element comprised in a plane perpendicular to the axis Z.

As visible on FIG. 1, the storage box 16 located, along the longitudinal axis X, between the driver's seat 12 and the rear structure 32. The lower bunk 18 is located on top of the storage box and the upper bunk 20 is located above the lower bunk, at a vertical distance d1 from the lower bunk. Thus, two users car lie down simultaneously on the lower bunk and on the upper bunk. Both the lower bunk and the upper bunk are thus located between the driver's seat and the rear structure 32. Furthermore, both the lower bunk and the upper bunk are extending along the transversal axis Y, alongside the rear structure, between the two side-walls 30. In other words, the largest dimension of the bunks 18 and 20 extends parallel to the transversal axis Y.

Both the lower bunk 18 and the upper bunk 20 have the shape of a rectangular cuboid, with two parallel lateral faces 34, located on the left and on the right of the bunks and parallel to axes X and Z, a front face 36, a rear face 38 parallel to the front face, a lower face 40 and an upper 42 face parallel to the lower face. The upper face 42 is, in practice, a bedding face, that is a face where a user is lying for resting. Generally, the upper face 42 is equipped with a mattress providing a soft surface.

Both the lower bunk 18 and the upper bunk 20 are rotatable between a horizontal position and a vertical position. In the horizontal position, shown in FIG. 1, the lower face 40 and the upper face 42 are perpendicular to the vertical axis Z, that is horizontal, such that the upper face is oriented upwardly, allowing as user to lie down on it. In the vertical position, non-represented, the lower face and the upper face are perpendicular to the longitudinal axis X, that is are vertical, such that the lower face 40 is oriented towards the rear structure 32 and the upper face 42 is oriented towards the driver's seat.

The fact that the upper faces 42 of the lower bunk 18 and of the upper bunk 20 are oriented towards the driver's seat 12 in the vertical position of the bunks is particularly advantageous to increase the safety of a user installed in the driver's seat in case of an accident. Indeed, since the upper faces are soft, they are providing a cushioning effect if the user comes in contact with the upper faces during the accident, thereby reducing the risk of injury.

Figure 2:
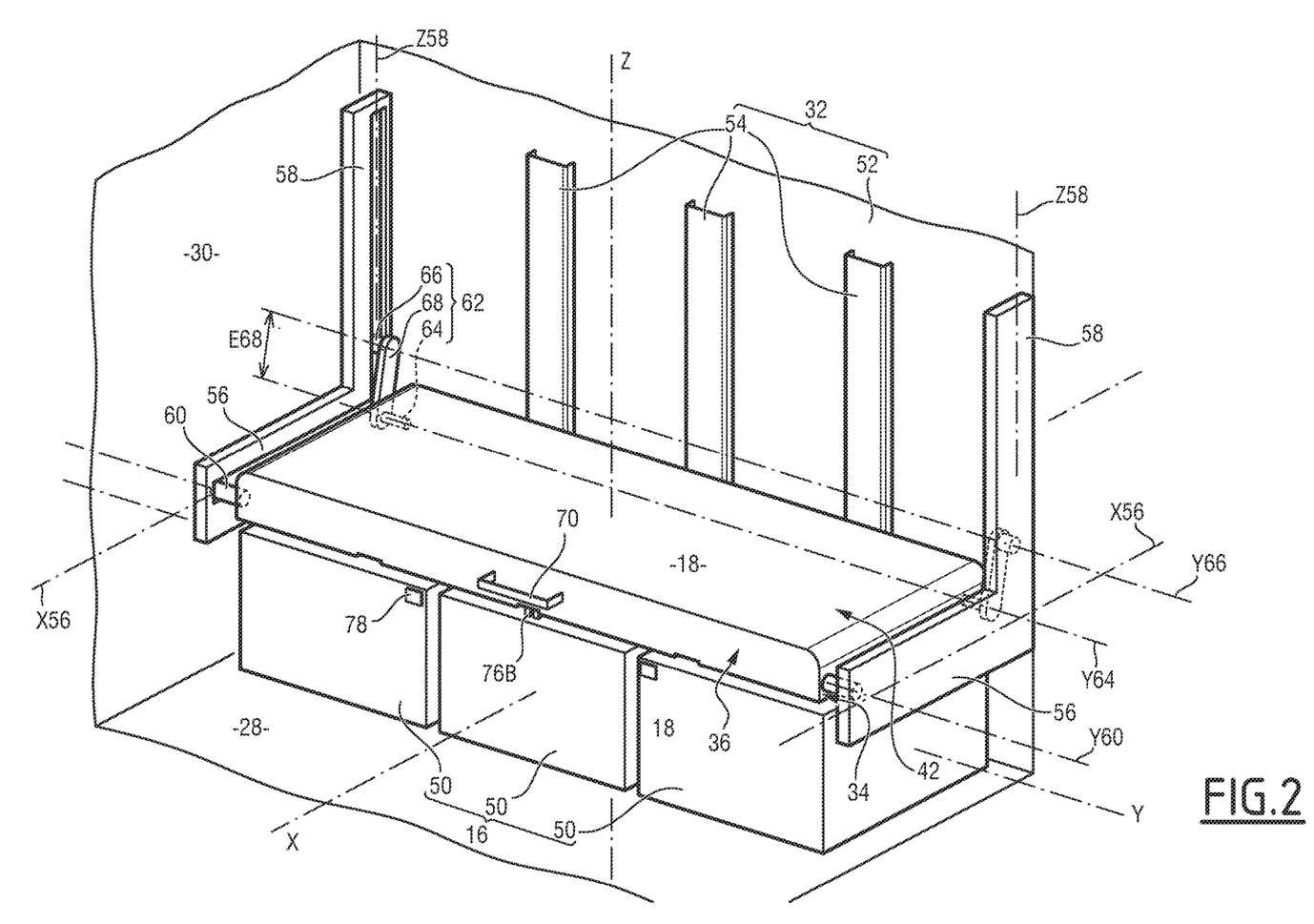
FIG. 2 is a perspective view of a part of a truck cabin according to a second embodiment of the invention, with a bunk in a horizontal position.
Figure 3:
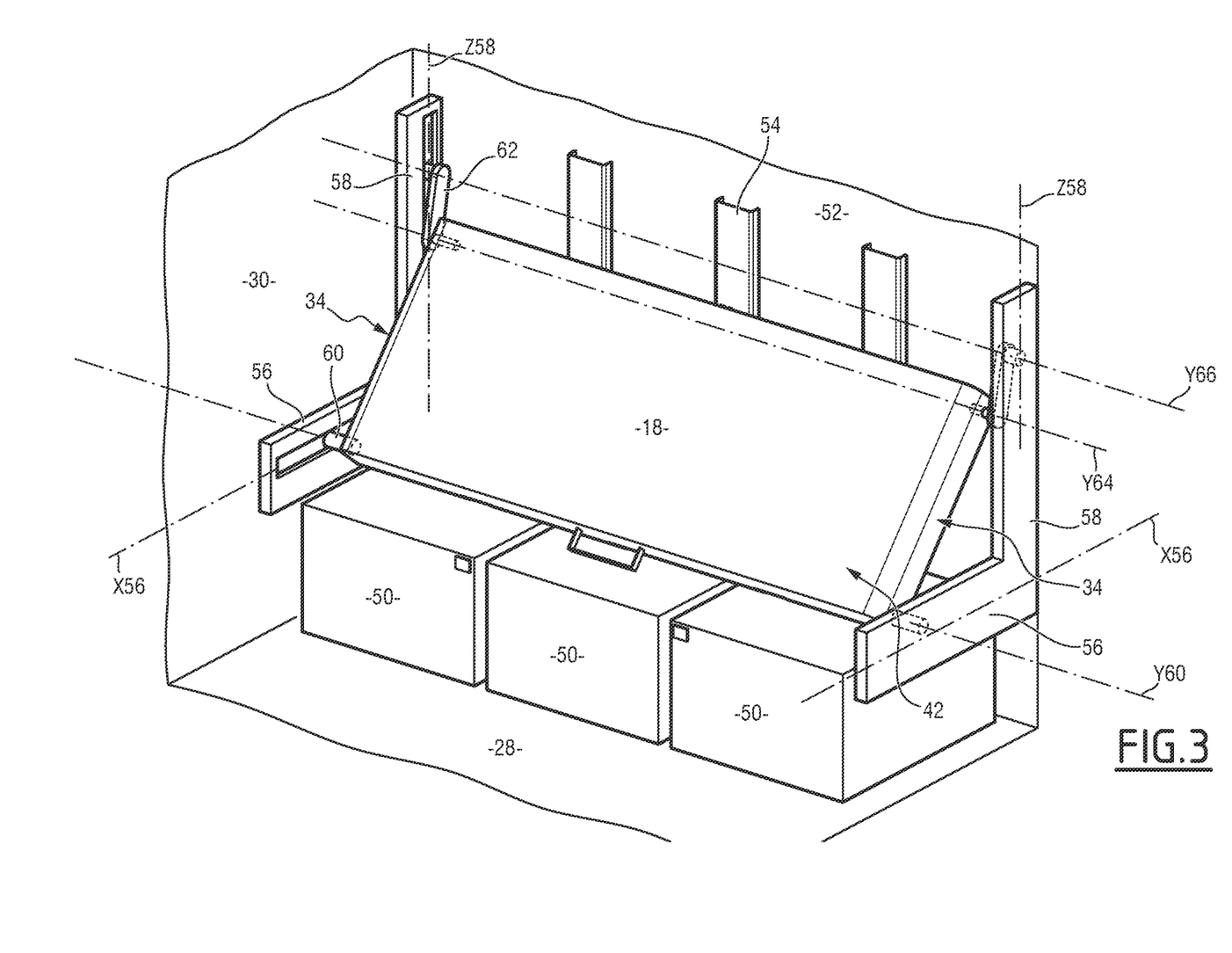
FIG. 3 is a perspective view similar to FIG. 2, with the bunk in an intermediate position.
Figure 4:
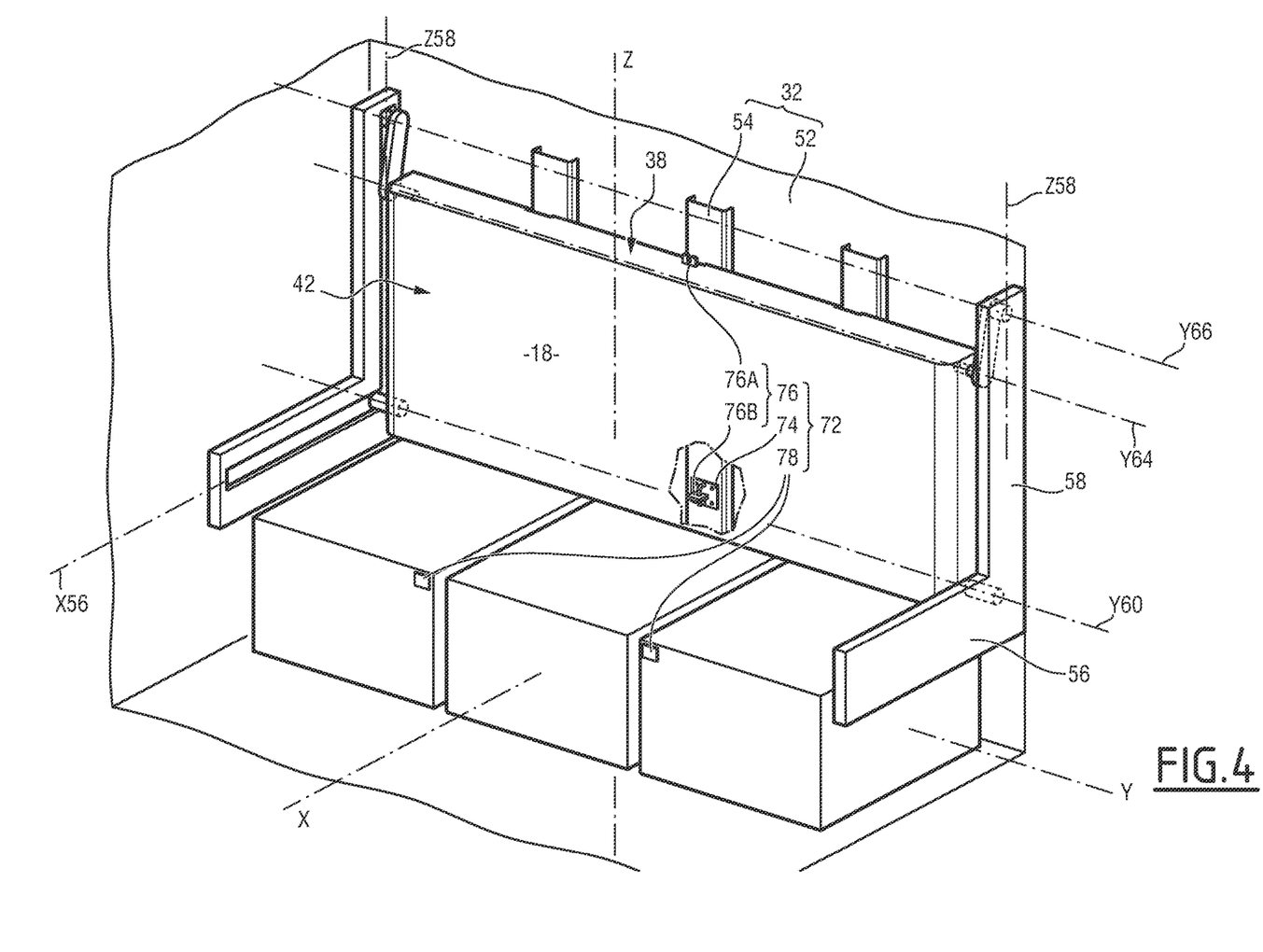
FIG. 4 is a perspective view similar to FIGS. 2 and 3, with the bunk in a vertical position.
Figure 5:
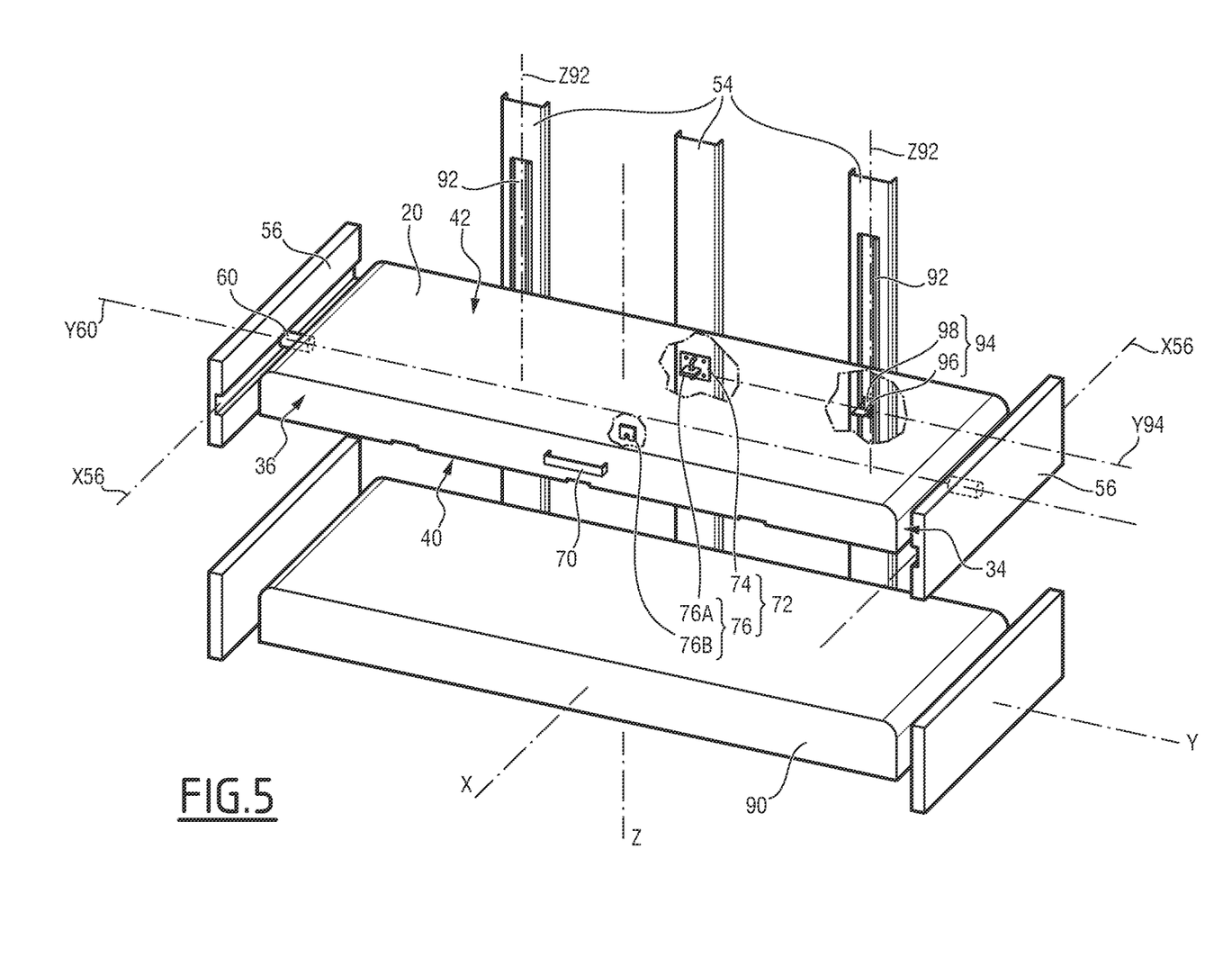
FIG. 5 is a perspective view of a part of a truck cabin according to a third embodiment of the invention, with a bunk in an horizontal position.
Figure 6:
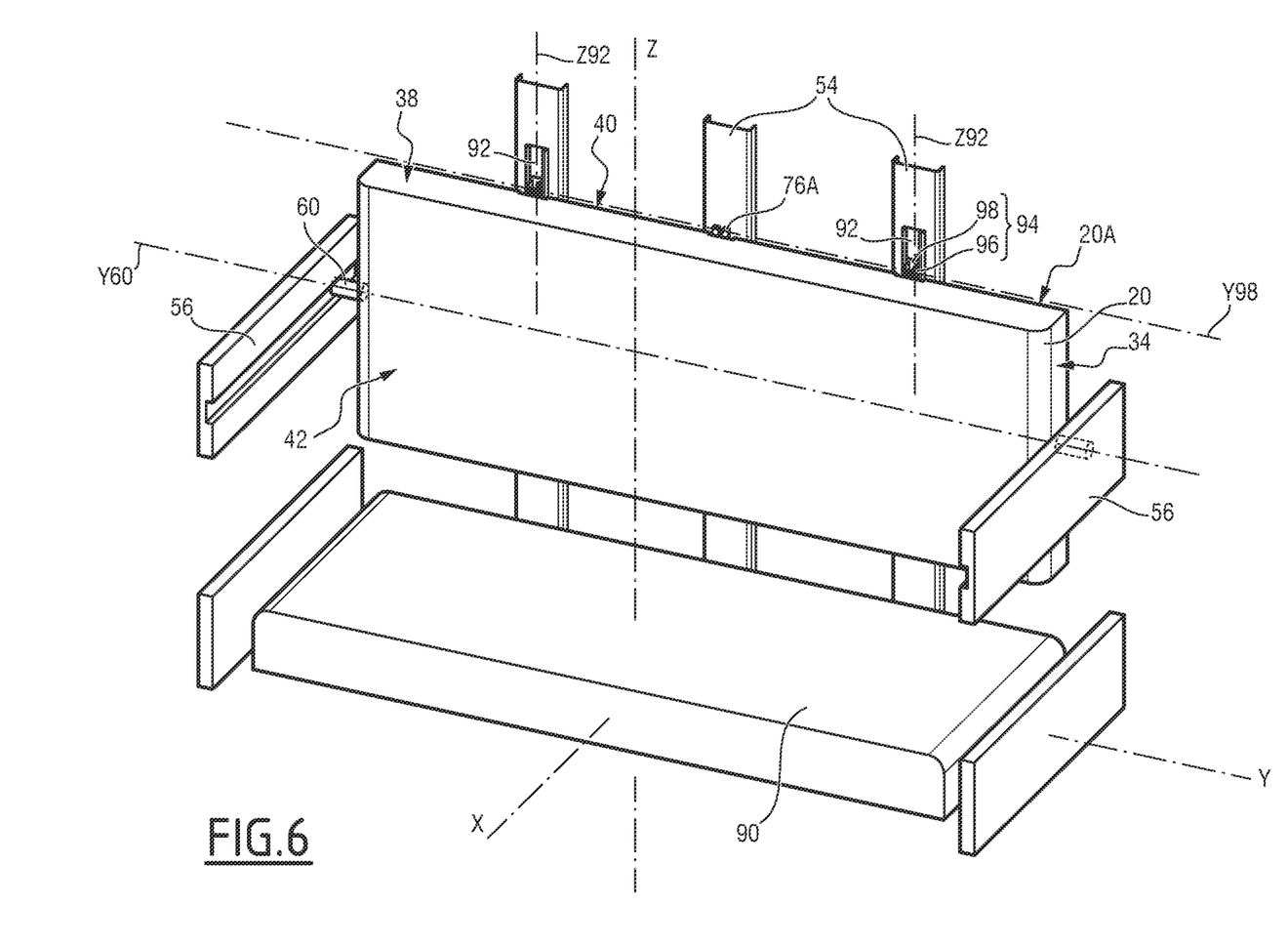
FIG. 6 is a perspective view similar to FIG. 5, with the bunk in a vertical position.

The lower bunk 18 and the upper bunk 20 are described in more details respectively with regards to the second and third embodiments of the cabin 10, with reference to FIGS. 2 through 4 for the second embodiment and to FIGS. 5 and 6 for the third embodiment.

In the second and third embodiments, the parts similar to those in the first embodiment have the same references and function in the same way. If a reference is used in the description of the second and of the third embodiments without being reproduced in the corresponding figures, it corresponds to the part or part bearing the same reference in the first embodiment. In the following, mainly the differences between each embodiment and the preceding embodiment(s) are described.

In the second embodiment, the cabin 10 comprises only a lower bunk 18. In the description of the second embodiment, the lower bunk 18 is designated indifferently by the expression "lower bunk" or "bunk".

On FIGS. 2 to 4, one side-wall 30 and the rear structure 32 are partially shown, while the windshield 24, the roof 26, the steering wheel 14 and the driver's seat 12 are not shown.

Here, the storage box 16 comprises three sub-units 50, each forming a storage volume.

In the second embodiment, the rear structure 32 comprises a rear wall 52 and multiple posts 54, in the example three posts 54, fixed on the rear wall. Each post 54 extends vertically, parallel to the vertical axis Z. The rear wall is perpendicular to the longitudinal axis X and the posts 54 are therefore arranged parallel to the transversal axis Y.

The frame 22 comprises two horizontal rails 56, fixed on the side-walls 30, located on either side of the bunk 18 along the transversal axis Y and extending each along an horizontal axis X56 parallel to the longitudinal axis X.

The frame 22 also comprises two vertical rails 58, fixed on the side-walls 30, located on either side of the bunk 18 along the transversal axis Y and extending each along a vertical axis Z58 parallel to the vertical axis Z. Alternatively the vertical rails 58 may be fixed on the rear wall 52.

To allow the rotation of the lower bunk 18 between its horizontal position and its vertical position, the bunk is connected, on the one hand, to the two horizontal rails 56 by two horizontal connectors 60, and on the other hand, to the two vertical rails 58 by two vertical connectors 62.

In the example, the horizontal connectors 60 are made by pins. The horizontal connectors are configured for pivoting around a first pivoting axis Y60. The pivoting axis Y60 is shared by the two horizontal connectors 60 and is parallel to the transversal axis Y. The horizontal connectors 60 are also configured for sliding along the horizontal rails 56, that is along the horizontal axis X56.

In the second embodiment, the horizontal connectors 60 are connected to the lateral faces 34 of the bunk 18. Alternatively, the horizontal connectors 60 can be connected to the front face 36 or to the lower face 40 of the bunk. In any case, the horizontal connectors 60 are located at a frontal portion of the bunk, that is, close to, or on, the front face 36.

A frontal portion of the bunk 18 is, for example, defined as the portion of the bunk distant from the front face 36 by no more than 20% of the total bunk width, the width of the bunk being considered along the longitudinal axis X when the bunk is in its horizontal position.

In the example, each vertical connectors 62 comprises a bunk pin 64, connected to the bunk 18, a rail pin 66, connected to one of the vertical rails 58, and a guide link 68, rigidly connecting the bunk pin 64 and the rail pin 66. Parts 64, 66 and 68 together form a crankshaft.

The bunk pins 64 are configured for pivoting around a second pivoting axis Y64. The second pivoting axis Y64 is shared by the two bunk pins 64 and is parallel to the transversal axis Y.

The rail pins 66 are configured for pivoting around a third pivoting axis Y66. The third pivoting axis Y66 is shared by the two rail pins 66 and is parallel to the transversal axis Y. The rail pins 66 are also configured for sliding along the vertical rails 58, that is along the vertical axis Z58.

Thanks to the guide link 68, the second pivoting axis Y64 and the third pivoting axis Y66 are offset from each other. Preferably, the offset distance E68 between the second pivoting axis Y64 and the third pivoting axis Y66, measured perpendicular to the transversal axis Y, is comprised between 100 mm and 300 mm, for example equal to 200 mm.

In a non-represented variant, the vertical connectors 62 are made by pins similar to the horizontal connectors 60, that is directly connecting the bunk to the vertical rails 58.

In the second embodiment, the vertical connectors 62, and more precisely the bunk pins 64, are connected to the lateral faces 34 of the bunk. Alternatively, the bunk pins 64 can be connected to the rear face 38 or to the lower face 40 of the bunk. In any case, the vertical connectors 62 are located at a rear portion of the bunk, that is close to, or on, the rear face 38.

A rear portion of the bunk 18 is, for example defined as the portion of the bunk distant from the rear face 38 by no more than 20% of the total bunk width, the width of the bunk being considered along the longitudinal axis X when the bunk is in its horizontal position.

With the horizontal connectors 60 and the vertical connectors 62, the bunk 18 is configured for rotating around the first pivoting axis Y60 and around the second pivoting axis Y64. These pivoting movements, combined with the sliding of the horizontal connectors 60 along the horizontal rails 56 and with the sliding of the rail pins 66 along the vertical rails 58, allow the bunk to rotate between its horizontal position and its vertical positions, and reciprocally, with the upper face 42 oriented upwardly in the horizontal position and oriented towards the front of the cabin 10 in the vertical position.

In the second embodiment, the rotation of the bunk 18 is driven by a user. To rotate the bunk from its horizontal position toward its vertical position, the user pushes on the bunk along the longitudinal axis X towards the back of the cabin 10, for example by pushing on the front face 36 of the bunk. To rotate the bunk from its vertical position toward its horizontal position, the user pulls on the bunk along the longitudinal axis X towards the front of the cabin, for example by pulling the front face 36 of the bunk. Advantageously, the front face of the bunk is equipped with a handle 70 to help the user pushing or pulling the bunk.

The rotation of the bunk 18 from its horizontal position toward its vertical position is facilitated by the guide link 68. Indeed, the offset distance E68 between the second pivoting axis Y64, around which the bunk 18 rotate, and the third pivoting axis Y66, around which the guide links 68 rotate, facilitates the vertical sliding of the rail pins 66 in the vertical rails 58 when the bunk is pushed horizontally.

In a non-represented variant, the rotation of the bunk is driven by one or several motors, configured to force the horizontal sliding of the horizontal connectors 60 along the horizontal rails 56 and the vertical sliding of the rail pins 66 along the vertical rails 58. Such motors are for example driving a rack and pinion mechanism, a chain drive, a rigid belt, vertical rail and sliders with linear motion guideways or any other actuator. This or these motors are preferably electric motors.

Due to the positioning of the horizontal connectors 60, at the frontal portion of the bunk 18, the front face 36 of the bunk does not move relative to the vertical axis Z during the rotation of the bunk between its horizontal and vertical positions. In other words, during the rotation of the bunk, the front face 36 is stationary in height and is only displaced along the longitudinal axis X.

Due to the connection between the vertical connectors 62 and the vertical rails 58, during the rotation of the bunk 18, the rear face 38 does not move horizontally, that is relative to the longitudinal axis X and the transversal axis Y. In other words, the rear face 38 is stationary in a horizontal plane parallel to axes X and Y and is only displaced along the vertical axis Z. Furthermore, during the rotation of the bunk from the horizontal position towards the vertical position, the rear face 38 moves only upwardly.

Thanks to these movements of the front face 36 and the rear face 38, the bunk 18 never comes in contact with the storage box 16 during its rotation.

Advantageously, to secure both the horizontal and the vertical position of the bunk 18, the cabin 10 comprises a locking mechanism 72.

In the example, the locking mechanism 72 comprises a striker 74, fixed on the rear structure 32, and more precisely on one of the posts 54, and oriented towards the front of the cabin 10, and two latches 76, both fixed on the bunk 18. When the bunk is in the horizontal position, along the longitudinal axis X, a first latch 76A, designated as a rear latch, is located in the rear portion of the bunk, and a second latch 76B, designated as a front latch, is located in the frontal portion of the bunk.

The locking mechanism 72 is visible in FIG. 4 only, where the bunk 18 is locally pulled out to show the striker 74 and the front latch 76B Alternatively, the striker 74 is fixed on the rear wall 52.

In the example, the rear latch 76A is fixed on the rear face 38 of the bunk 18 and the front latch 76B is fixed on the lower face 40 of the bunk. This positioning of the latches 76 is advantageous, since the latches are not visible by a user when the bunk is in the horizontal position. Alternatively, the rear latch is fixed on the lower face 40 and/or the front latch is fixed on the front face 36 of the bunk.

The latches 76 are located so that, when the bunk is in the horizontal position, the striker 74 is caught by the rear latch 76A, thus securing the horizontal position of the bunk, and so that, when the bunk is in the vertical position, the striker is caught by the front latch 76B, thus securing the vertical position of the bunk.

The locking mechanism 72 comprises at least one button 78, in the example two buttons 78. When pressed by a user, the buttons 78 open the latches 76 so as to release the striker 74. In the example, the buttons 78 are attached to the storage box 16, but they could be placed elsewhere. In other words, the buttons 78 are provided to unlock the locking mechanism 72. Alternatively, the latches 76 can be opened at distance, for example by a remote or by a computer.

In an non-represented variant of the invention, the locking mechanism 72 can be replaced by electromechanical locks. This variant is particularly useful when the rotation of the bunk is driven by one or several motors, since it allows the bunk to be rotated without user intervention while securing the horizontal and vertical positions of the bunk.

Advantageously, when the horizontal position of the bunk 18 is secured by an electromechanical lock, the electromechanical lock is configured to be automatically unlocked in case of an accident, thus allowing rotation of the bunk towards its vertical position. Unlocking the rotation of the bunk in case of an accident can, for example, facilitate evacuation of the cabin 10 by the driver, or rescue operations.

In the third embodiment, the cabin 10 comprises an upper bunk 20 located above a lower bunk 90. The lower bunk 90 is fixed in an horizontal position and is therefore not rotatable. In the description of the third embodiment, the upper bunk 20 is designated indifferently by the expression "upper bunk" or "bunk".

In the third embodiment, as in the second embodiment, the rear structure 32 comprises a rear wall 52 and multiple posts 54, in the example three posts 54.

On FIGS. 5 and 6, the driver's seat 12, the steering wheel 14, the storage box 16, the windshield 24, the roof 26, the floor 28, the side-walls 30 and the rear wall 52 are not shown.

The frame 22 comprises two horizontal rails 56, fixed on the side-walls 30, located on either side of the upper bunk 20 along the transversal axis Y and extending each along an horizontal axis X56 parallel to the longitudinal axis X. These horizontal rails are similar to the horizontal rails of the second embodiment.

The frame 22 also comprises two vertical rails 92, fixed on the rear structure 32, in the example on two posts 54. The vertical rails 92 are thus located on the rear of the bunk 20, between the bunk and the rear wall 52, and extend each along a vertical axis Z92 parallel to the vertical axis Z.

To allow the rotation of the upper bunk 20 between its horizontal position and its vertical position, the bunk is connected, on the one hand, to the two horizontal rails 56 by two horizontal connectors 60 which operate in the same way as those of the second embodiment, and on the other hand, to the two vertical rails 92 by two vertical connectors 94.

The only difference between the horizontal connectors 60 of the third embodiment and the horizontal connectors 60 of the second embodiment is their localization along the longitudinal axis X. Indeed, in the third embodiment, the horizontal connectors are located in a middle portion of the bunk 20, that is away from the front face 36 and away from the rear face 38.

A middle portion of the bunk 20 is, for example, defined as the portion of the bunk distant from the front face 36 by at least 20% of the total bunk width, and distant from the rear face 38 by at least 20% of the total bunk width, the width of the bunk being considered along the longitudinal axis X when the bunk is in its horizontal position.

The horizontal connectors 60 are forming a first pivoting axis Y60 of the bunk 20.

In the third embodiment, each vertical connector 94 comprises a bracket 96, rigidly fixed to the bunk 20, and a slider 98. The slider 98 is configured for sliding vertically along a vertical rail 92 and is pivotally attached with the bracket 96. In other words, the slider 98 and the bracket 96 of a vertical connector 94 are attached to each other and movable with respect to each other along a pivoting axis Y94 parallel to the transversal axis Y. The two vertical connectors 94 have the same pivoting axis Y94.

The pivoting axis Y94 corresponds to a second pivoting axis of the bunk 20.

One of the vertical connectors 94 is visible in FIG. 5 only, where the bunk 20 is locally pulled out to show the bracket 96 and the slider 98.

In the example, the brackets 96 are attached to an edge 20A of the bunk 20, located at the junction between the rear face 38 and the lower face 40. Alternatively, the brackets 96 can be connected to the rear face 38 or to the lower face 40, at the rear portion of the lower face, along the longitudinal axis X.

With the horizontal connectors 60 and the vertical connectors 94, the bunk 20 is configured for rotating around the first pivoting axis Y60 and around the second pivoting axis Y94. These pivoting movements, combined with the sliding of the horizontal connectors 60 along the horizontal rails 56 and with the sliding of the sliders 98 along the vertical rails 92, allow the bunk to rotate between its horizontal position and its vertical position, and reciprocally, with the upper face 42 oriented upwardly in the horizontal position and oriented towards the front of the cabin 10 in the vertical position.

In the third embodiment, as in the second embodiment, the rotation of the bunk 20 is driven by a user and the front face 36 of the bunk is advantageously equipped with a handle 70. Advantageously, in the third embodiment, the user can also push the front face 36 of the bunk downwardly to facilitate the rotation of the bunk.

Alternatively, the rotation of the bunk can be driven by one or several motors configured to force the horizontal sliding of the horizontal connectors 60 along the horizontal rails 56, and/or to force the vertical sliding of the sliders 98 along the vertical rails 92.

Due to the positioning of the horizontal connectors 60, in the middle portion of the bunk 20, the front face 36 of the bunk move relative to the vertical axis Z during the rotation of the bunk between its horizontal and vertical positions, in addition to its movement along the longitudinal axis X. In other words, along the vertical axis Z, the front face 36 is descending during the rotation of the bunk from its horizontal position towards its vertical position, and the front face 36 is ascending during the rotation of the bunk from its vertical towards its horizontal position. Advantageously, the exact positioning of the horizontal connectors 60 is chosen depending of the desired vertical position of the bunk: the closer the horizontal connectors are to the front face 36 and the higher the rear face 38 when the bunk is in the vertical position, and vice versa.

As in the second embodiment, the rear face 38 does not move horizontally during the rotation of the bunk 20. Furthermore, during the rotation of the bunk from the horizontal position towards the vertical position, the rear face 38 only moves upwardly.

Due to these movements of the front face 36 and the rear face 38, in the vertical position, the bunk 20 extends lower than the horizontal rails 56. The front face 36 of the bunk is closer to the lower bunk 90 when the bunk 20 is in the vertical position than the lower face 40 when the bunk is in the horizontal position. This is particularly useful to keep sufficient space between the lower bunk 90 and the upper bunk 20 when the upper bunk is in horizontal position to allow a user to comfortably lie down the lower bunk, while bringing the upper bunk sufficiently close to the lower bunk when the upper bunk is in the vertical position so that the upper face 42 of the upper bunk 20 can be used as a comfortable backrest for someone seating on the lower bunk.

This movement of the upper bunk 20 is also advantageously to allow the upper bunk to be arranged closer to the roof 26 of the cabin 10, since the vertical displacement of the rear face 38 upwardly, when the bunk is rotated from its horizontal position towards its vertical position, is smaller than in the second embodiment.

The upper bunk 20 comprises a locking mechanism 72 similar to the locking mechanism of the lower bunk 18 according to the second embodiment. The striker 74 and the latches 76 are visible in FIG. 5 only, where the bunk 20 is locally pulled out to show them. Since the storage box 16 is not visible on FIGS. 5 and 6, the button 78 attached to it are also not visible on these Figures.

In the example, the striker 74 of the locking mechanism 72 is located on the center post 54 and the vertical connectors 94 are located on the outer posts 54, that is, on the left and on the right of the striker. Other arrangements can also be considered.

Thanks to the positioning of the horizontal connectors 60, in the middle portion of the bunk of the third embodiment, the bunk 20 is particularly adapted to be used as an upper bunk, while the bunk 18 according to the second embodiment is particularly adapted to be used as a lower bunk, due to the positioning of the horizontal connectors 60 at the frontal portion of the bunk.

The bunks 18 and 20 can therefore be installed in a truck cabin in different combination, to optimize the interior space of the cabin. For example, the first embodiment with both the lower bunk 18 and the upper bunk 20 is particularly adapted to obtain two separate bunks in a small cabin, while maintaining access to the storage box 16 and allowing the lower bunk to be used as a bench, with the upper bunk in the vertical position forming a backrest. In addition, the upper bunk is easy to add in an existing cabin with a fixed lower bunk, as a retrofit.

It is to be understood that the present invention is not limited to the embodiments described above and illustrated in the drawings; rather, the skilled person will recognize that many changes and modifications may be made within the scope of the appended claims.

For example, one can modify the lower bunk 18 of the second embodiment to replace the vertical rails 58 and the vertical connectors 62 with the vertical rails 92 and the vertical connectors 94 of the third embodiment. Similarly, the upper bunk 20 can also be modified to use the vertical rails 58 and the vertical connectors 62 instead of the vertical rails 92 and the vertical connectors 94.

It is also possible, in the second embodiment, to use a number of vertical connectors 94 different from two, for example one or three vertical connectors. The number of vertical rails 92 is adapted accordingly.

The features of the embodiment and variants considered in this description can be combined to generate new embodiments of the invention, in the framework of the appended set of claims.

The invention claimed is:

1. A truck cabin comprising a driver's seat, a bunk, and a frame, the frame comprising a rear structure delimiting the rear of the cabin along a longitudinal axis of the cabin, wherein:
   the bunk has the shape of a rectangular cuboid, with two parallel lateral faces, a front face, a rear face parallel to the front face, a lower face, and an upper face parallel to the lower face and which is a bedding face;
   the bunk is located between the driver's seat and the rear structure, along the longitudinal axis, and extends along a transversal axis of the cabin, alongside the rear structure;
   the bunk is rotatable between a horizontal position, in which the upper face is horizontal and oriented upwardly, and a vertical position, in which the upper face is vertical; and
   in the vertical position, the lower face of the bunk is oriented towards the rear structure and the upper face is oriented towards the driver's seat,
   wherein the frame comprises:
      two horizontal rails located on either side of the bunk along the transversal axis and extending each along a horizontal axis parallel to the longitudinal axis, and
      at least one vertical rail, extending parallel to a vertical axis perpendicular to the longitudinal axis and to the transversal axis;
   wherein the bunk is connected to the horizontal rails by two horizontal connectors, each of the two horizontal connectors allowing:
      pivoting of the bunk around a first pivoting axis parallel to the transversal axis, the first pivoting axis being shared by the two horizontal connectors; and
      sliding of the bunk along one of the two the horizontal rails;
   wherein the bunk is connected to the at least one vertical rail by a vertical connector allowing:
      pivoting of the bunk around a second pivoting axis parallel to the transversal axis; and
      sliding of the bunk along the at least one vertical rail, wherein the vertical connector comprises:
- a bunk pin, connected to the bunk so as to be able to pivot around the second pivoting axis;
- a rail pin, connected to one of the vertical rails so as to be able to pivot around a third pivoting axis parallel to the transversal axis and to slide along the at least one vertical rail; and
- a guide link rigidly connecting the bunk pin to the rail pin so that the second pivoting axis and the third pivoting axis are offset from each other.

2. The truck cabin of claim 1, wherein, during the rotation of the bunk from the horizontal position to the vertical position, the rear face of the bunk is moving upwardly.

3. The truck cabin of claim 1, wherein an offset distance between the second pivoting axis and the third pivoting axis, measured perpendicular to the transversal axis, is comprised between 100 mm and 300 mm.

4. The truck cabin of claim 3, wherein an offset distance between the second pivoting axis and the third pivoting axis, measured perpendicular to the transversal axis, is equal to 200 mm.

5. The truck cabin of claim 1, wherein the vertical rail is located on the rear structure and wherein the vertical connector comprises a bracket fixed on the bunk and a slider pivotally attached with the bracket and sliding along the vertical rail.

6. The truck cabin of claim 1, wherein the horizontal connectors are located, along the longitudinal axis, on a frontal portion of the bunk and wherein, during the rotation of the bunk from the horizontal position to the vertical position, the front face is stationary along the vertical axis.

7. The truck cabin of claim 1, wherein the horizontal connectors are located, along the longitudinal axis, in a middle portion of the bunk and wherein, during the rotation of the bunk from the horizontal position to the vertical position, the front face is moving along the vertical axis downwardly.

8. The truck cabin of claim 1, wherein the truck cabin comprises a locking mechanism to secure the bunk in the horizontal position and to secure the bunk in the vertical position.

9. The truck cabin of claim 8, wherein the locking mechanism comprises:
- a striker, fixed on the rear structure;
- two latches, fixed on the bunk;
- a rear latch being located, along the longitudinal axis and when the bunk is in the horizontal position, in a rear portion of the bunk to cooperate with the striker for locking the bunk in the horizontal position; and
- a front latch being located, along the longitudinal axis and when the bunk is in the horizontal position, in a frontal portion of the bunk to cooperate with the striker for locking the bunk in the vertical position.

10. The truck cabin of claim 8, wherein the locking mechanism comprises a release button, configured to unlock the locking mechanism.

11. The truck cabin of claim 1, wherein the rotation of the bunk is driven by at least one motor.

12. The truck cabin of claim 11, wherein the at least one motor is an electric motor.

13. The truck cabin of claim 1, wherein the rotation of the bunk is driven by a user pushing or pulling on the bunk along the longitudinal axis.

* * * * *